United States Patent

[11] 3,551,777

| | | |
|---|---|---|
| [72] | Inventor | Donald W. Bingley<br>South Woodford, London, England |
| [21] | Appl. No. | 788,690 |
| [22] | Filed | Dec. 26, 1968 |
| [45] | Patented | Dec. 29, 1970 |
| [73] | Assignee | AMP, Incorporated<br>Harrisburg, Pa.<br>Continuation of application Ser. No.<br>526,900, Feb. 11, 1966. |

[54] INVERTER-CONVERTER WITH REGULATION OF AC AND DC OUTPUTS
6 Claims, 3 Drawing Figs.

[52] U.S. Cl. .................................................. 321/2,
307/11; 321/18; 331/47, 331/113.1
[51] Int. Cl. ..................................................... H02p 13/26;
H03b 3/00
[50] Field of Search .......................................... 321/2, 16,
18, 20; 331/47, 113.1; 307/11, 33

[56] References Cited
UNITED STATES PATENTS

| | | | |
|---|---|---|---|
| 3,319,180 | 5/1962 | Mesenheimer................ | 331/47 |
| 3,337,787 | 8/1967 | Joseph........................... | 321/2 |
| 3,403,318 | 9/1968 | Krauthamer et al. ......... | 321/18X |

Primary Examiner—William H. Beha, Jr.
Attorney—Curtis, Morris and Safford, Marshall M. Holcombe, William Hintze, William J. Keating, Frederick W. Raring, and John R. Hopkins ABSTRACT: An unregulated DC supply voltage is pulse-width-modulated, regulated and integrated to provide a preregulated DC voltage which is applied to an inverter, the frequency of which is controlled by a synchronizer energized by the preregulated DC voltage. Networks coupled to the output from the inverter provide regulated AC and DC outputs.

INVERTER-CONVERTER WITH REGULATION OF AC AND DC OUTPUTS

This is a continuation of application Ser. No. 526,900, filed Feb. 11, 1966.

This invention relates to an inverter-converter circuit and more particularly to a circuit arrangement to provide regulated AC and DC supplies.

In a number of applications, a necessity arises wherein it is essential, due to size and weight restrictions, that a power supply be very small and at the same time provide a frequency- and voltage-regulated power supply in addition to supplying more than one type of voltage at an efficient rate.

A primary object of the invention is to provide a circuit arrangement to supply frequency and voltage, closely regulated AC entirely isolated from the input power source.

Another object of the invention is the provision of an electronic circuit to supply frequency- and voltage-regulated AC and regulated DC A further object of the invention is to provide a circuit arrangement having a high power-to-volume ratio.

An additional object of the invention is the provision of an electronic circuit that is efficient in operation so as to reduce power drain on a limited source of supply.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

The foregoing objects are achieved by a circuit arrangement comprising a source of unregulated DC voltages, modulation means receiving the unregulated DC voltage, an integrating filter connected to the modulation means and inverter means receiving the preregulated filter signal to supply regulated DC voltage and AC voltage being supplied from a section of the inverter means. A voltage error circuit is connected between the integrating filter and the inverter means and is connected via an amplifier means to the modulation means to provide a feedback arrangement to control the operation of the modulation means. A frequency control synchronizer circuit is connected between the integrating filter and the inverter means.

In the drawings:

FIG. 3 is a diagrammatic representation of a part of the circuit arrangement of FIG. 2.

Figure 1:
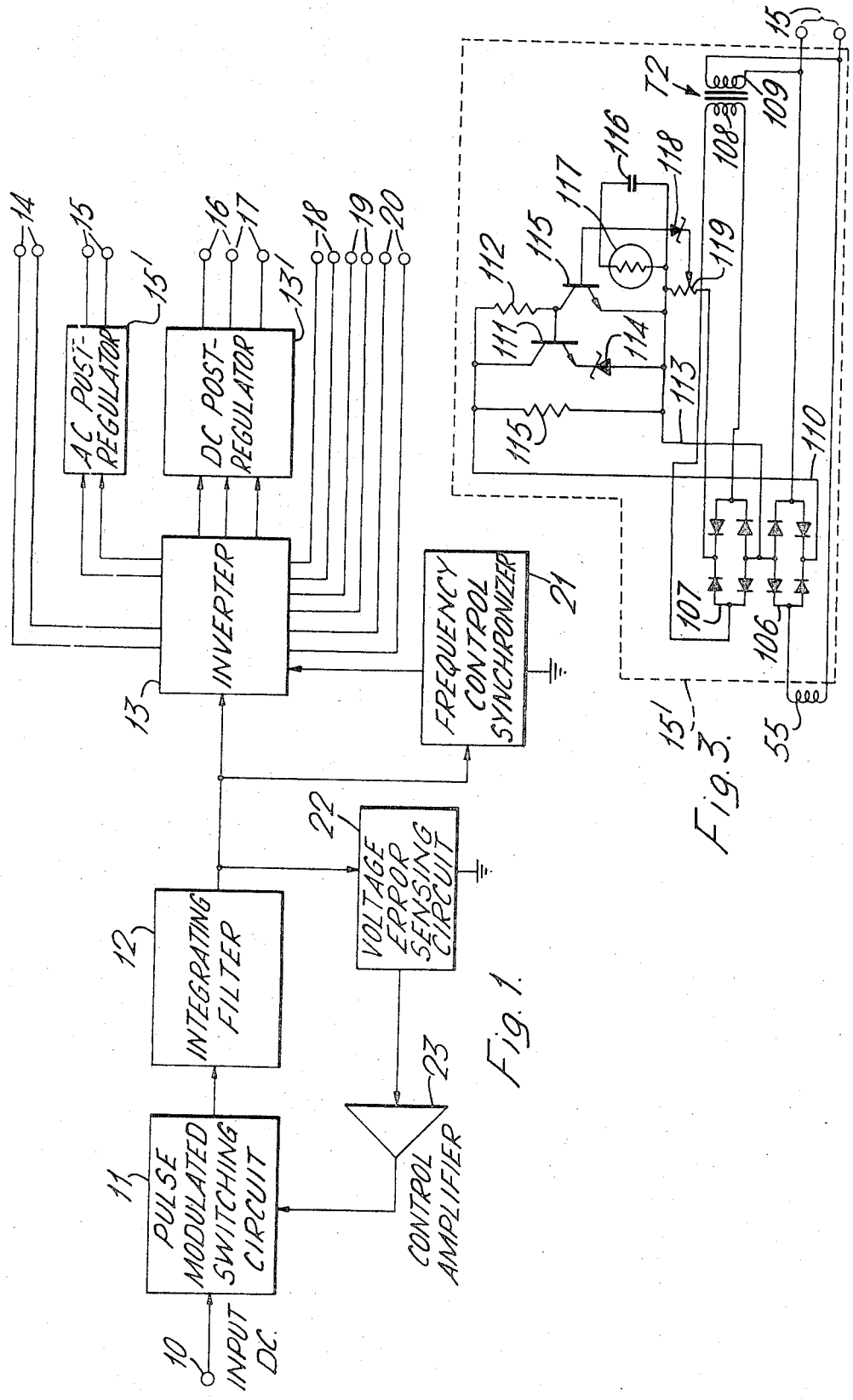
FIG. 1 is a general block diagram of the circuit arrangement of the present invention.

Turning now to the drawings, there is illustrated in FIG. 1 an inverter-converter circuit comprising an unregulated DC input 10 which is fed into a pulse-modulated, switching and regulating circuit 11. The output from circuit 11 is connected to an integrating filter 12 which in turn is connected to an inverter circuit 13. Outputs 14 through 20 emanate from inverter circuit 13. A post DC regulation circuit 13' is located in outputs 16 and 17 while a post AC regulation circuit 15' is in output 15. A frequency control synchronization circuit 21 is connected between integrating filter 12 and inverter 13. A voltage-error-sensing circuit 22 is connected between integrating filter 12 and inverter 13 and is connected to circuit 11 via amplifier 23.

Figure 2:
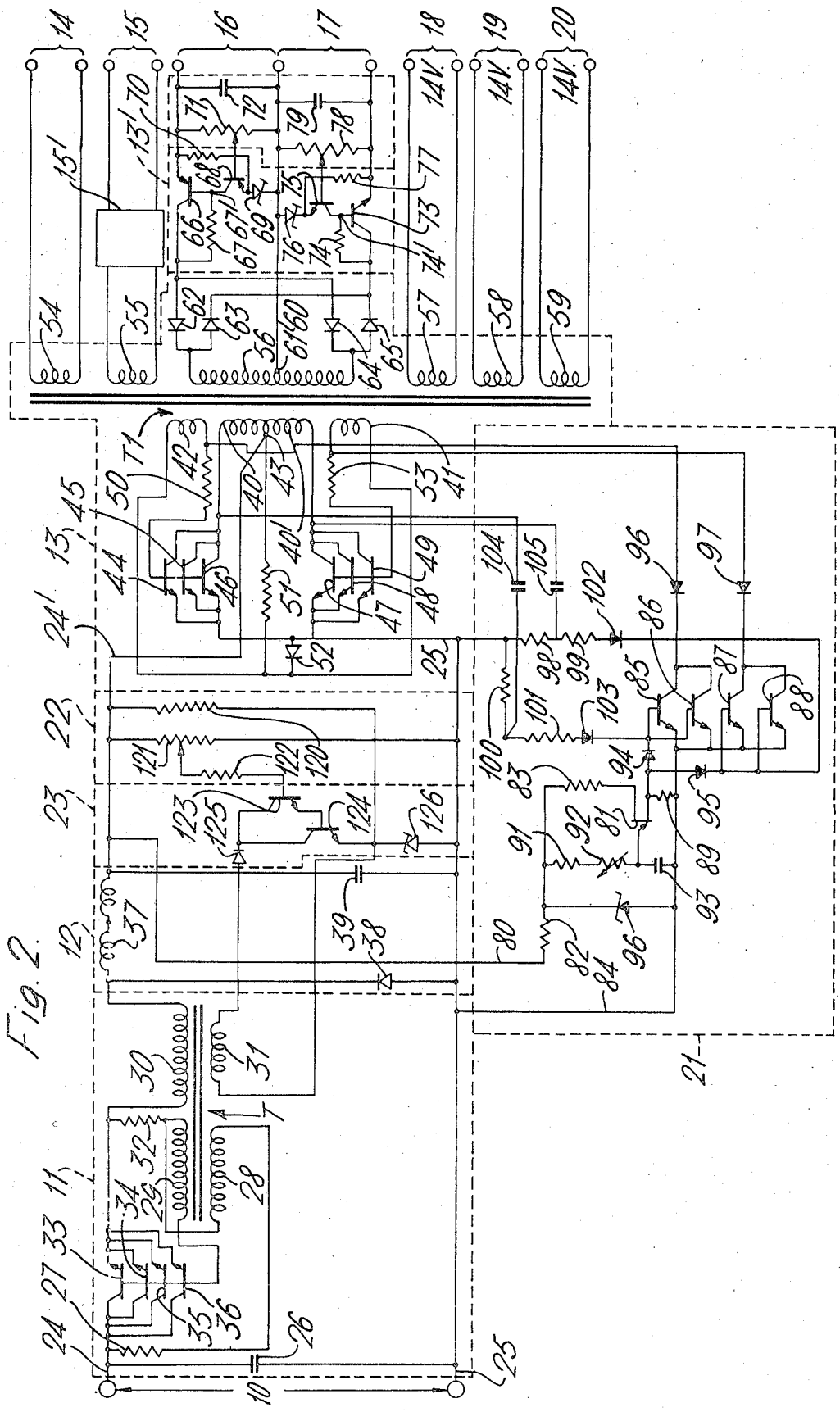
FIG. 2 is a diagrammatic representation of the circuit arrangement of FIG. 1.

Turning now to FIGS. 2 and 3 each side of DC input 10 is connected respectively to leads 24 and 25. Pulse-modulated, switching and regulation circuit 11 comprises a capacitor 26 connected between leads 24 and 25. One side of resistor 27 is connected to lead 24 and the other side is connected to one side of winding 28 of transformer T which also includes windings 29, 30 and 31. The other side of winding 28 is connected to the junction of resistor 32 and one side of winding 29. The other side of resistor 32 is connected to one side of winding 30 and the emitters of transistors 33 through 36 which are connected in parallel with each other across lead 24 via their collectors and emitters. The bases of these transistors are connected to common and to the other side of winding 29.

Integrating filter 12 includes an inductance 37 having one end serially connected to the other side of winding 30. A diode 38 has its cathode connected to the junction between inductance 37 and winding 30 while its anode is connected to lead 25. A capacitor 39 has one side connected to the other side of inductance 37 while the other side thereof is connected to lead 25.

Inverter circuit 13 comprises a transformer T1 having primary windings 40, 41 and 42. Lead 24' is connected to a center tap 43 of winding 40. The ends of winding 40 are connected to lead 25. Transistors 44 through 46 are connected in parallel relationship in lead 25 with the collectors thereof being connected to one side of winding 40. Transistors 47 through 49 are also connected in lead 25 and the collectors thereof are connected to the other side of winding 40. Thus, the emitters of transistors 44 through 46 are the emitters of transistors 47 through 49 are connected together. The bases of transistors 44 through 46 are connected together and are connected to one side of winding 42 via resistor 50. The other side of winding 42 is connected to one side of winding 41. The one side of winding 41 and the other side of winding 42 are connected to center tap 43 via resistance 51 and to the emitters of transistors 44 through 49 via diode 52. The bases of transistors 47 through 49 are connected together and are connected to the other side of winding 41 through resistor 53.

Transformer T1 has secondary windings 54, 55, 56, 57, 58 and 59. Winding 54 is connected to output 14, winding 55 is connected to output 15 via post AC regulator circuit 15', winding 57 is connected to output 18, winding 58 is connected to output 19 and winding 59 is connected to output 20. Outputs 14, 15, 18, 19 and 20 represent AC outputs.

Lead 60 is connected to a center tap 61 of winding 56 and this represents a common lead. Diodes 62 and 63 are connected in series with the junction there between connected to the other side of winding 56. The anodes of diodes 62 and 64 are connected together and the cathodes of diodes 63 and 65 are connected together. The anode of diode 62 is also connected to the collector of transistor 66 and to the junction of the base of this transistor and the collector of transistor 68 via resistance 67. The emitter of transistor 66 is connected to one of the output terminals of output 16 and is also connected to the junction of the emitter of transistor 68 and zener diode 69 via resistor 70. The other side of zener diode 69 is connected to common lead 60. The ends of potentiometer 71 are connected between common lead 60 and the one of the output terminals of output 16 while the base of transistor 68 is connected to the movable contact of potentiometer 71. The ends of capacitor 72 are connected between common lead 60 and the one of the output terminals of output 16.

The cathode of diode 65 is connected to the collector of transistor 73 and to the base of this transistor via resistance 74. The emitter of transistor 73 is connected to the junction of the emitter of transistor 75 and zener diode 76 via resistor 77. The other side of zener diode 76 is connected to common lead 60. The junction of the base of transistor 73 and resistance 74 is connected to the collector of transistor 75. The emitter of transistor 73 is also connected to one of output terminals 17. A potentiometer 78 is connected between output lead 60 and the one of the output terminals of output 17 while the movable contact of potentiometer 78 is connected to the base of transistor 75. A capacitor 79 is connected between common lead 60 and the one of the output terminals of output 17. The circuitry necessary to form post DC regulator circuit 13' is set forth in the box identified as 13' in FIG. 2.

Frequency control synchronizer circuit 21 comprises a lead 80 connected to lead 24' and is connected to one of the bases of unijunction transistor 81 via serially connected resistances 82 and 83. Lead 84 is connected to lead 25 and is connected to the emitters of transistors 85 through 88. The other base of unijunction transistor 81 is connected to lead 84 via resistance 89. A zener diode 90 is connected between the junction of resistors 82 and 83 and lead 84. A resistance 91, potentiometer 92 and capacitor 93 are connected between the junction of resistances 82 and 83 and lead 84. The emitter of unijunction transistor 81 is connected to the junction of potentiometer 92 and capacitor 93. The other base of unijunction transistor 81 is also connected to the anode junction of diodes 94 and 95. Diode 94 is connected to the bases of transistors 85 and 86 while the collectors thereof are connected via diode 96 to winding 42. Diode 95 is connected to the bases of transistors 87 and 88 while the collectors thereof are connected via diode 97 to winding 41. Lead 25 is connected to the junction of pairs of serially connected resistances 98, 99 and 100, 101. The pair of serially connected resistances 98 and 99 are connected to diode 95 via diode 102 and a pair of serially connected resistances 100 and 101 are connected to diode 94 via diode 103. One side of winding 40 is connected to the junction of serially connected resistances 100 and 101 via capacitor 104 and the other side of winding 40 is connected to the junction of serially connected resistances 98 and 99 via capacitor 105.

Post AC regulator circuit 15' which is connected in output circuit 15 and is illustrated in FIG. 3 has opposing legs of a diode bridge 106 in one of the output leads of output 15. One of the other opposing legs of diode bridge 106 is connected to a leg of diode bridge 107. Opposing legs of diode bridge 107 are connected to a winding 108 of transformer T2. Winding 109 of transformer T2 is connected across the leads of output 15. A lead 110 is connected to a leg of bridge 106 and is connected to the collector of transistor 111 and the base of this transistor via resistance 112. The emitter of transistor 111 is connected to lead 113 via zener diode 114 and lead 113 is connected to the junction between bridges 106 and 107. A transistor 115 is connected across leads 112 and 113. The collector of transistor 115 is connected to the junction of the base of transistor 111 and resistor 112 while the emitter of this transistor is connected to lead 113. The base of transistor 115 is connected to the parallel network of capacitor 116 and thermistor 117. A zener diode 118 has one end connected to the junction of the base of transistor 115, capacitor 116 and thermistor 117 while the other end is connected to the movable contact of potentiometer 119. Potentiometer 119 has one end connected to lead 113 and the other end connected to a leg of diode bridge 107.

Voltage-error-sensing circuit 22 comprises a resistance 120 having one end connected to lead 24' and the other end connected to one side of winding 31 of transformer T. A potentiometer 121 has its ends connected across leads 24' and 25 while the movable contact thereof is connected to one side of resistance 122.

Amplifier 23 includes a transistor 123 having its base connected to the other side of resistance 122. The emitter of transistor 123 is connected to the base of transistor 124 and the collectors of transistors 123 and 124 are connected via diode 125 to the other side of winding 31. The emitter of transistor 124 is connected via zener diode 126 to lead 25 and resistance 120 is connected to the junction of this emitter and zener diode.

The circuit arrangement is set into operation by the application of an unregulated DC power supply to the terminal of input 10.

The circuit arrangement described previously is set into operation by the application of unregulated DC power to input 10, FIG. 1. The DC power applied to pulse-modulated switching circuit 11 results in a switched output which is then fed into the integrating filter circuit 12 and emerges as preregulated DC power.

The voltage-error-sensing circuit 22 monitors the value of preregulated voltage and transmits a corrective signal to control amplifier 23, which in turn compares this signal to a reference and adjusts the switching rate of circuit 11 as required for regulation. The DC input preregulator stage is comprised of circuits 11, 12, 22 and 23.

The preregulated DC voltage in turn is fed into inverter circuit 13 and its associated frequency control synchronizer circuit 21. The frequency control synchronizer circuit 21 accurately determines the AC frequency required and uniquely controls the switching rate of inverter circuit 13 to this frequency. Inverter circuit 13 switches the DC power into various levels of AC power and applies them directly to outputs 14, 18, 19 and 20, and to post regulators 15, 16 and 17. The DC postregulator circuit 13' reconverts AC power from inverter circuit 13 into accurately regulated DC power to outputs 16 and 17. The AC postregulator circuit 15' supplies accurately regulated AC power to output 15.

With reference to FIG. 2, the collectors of switching transistors 33, 34, 35 and 36 of pulse-modulated switching regulator circuit 11 are connected to positive polarity of DC input power by means of lead 24. Primary winding 30 of current transformer T is connected between the emitters of switch transistors 33 to 36, and the input to integrating filter circuit 12. One side of secondary winding 29 to transformer T is connected directly to common base connection of switch transistor group 33 to 36 and with the other side of their emitters through resistor 32 and also to a connection of bias winding 28. The other bias winding connection is to the collectors of transistors 33 to 36 via resistor 27. Control winding 31 leads are connected directly to control amplifier circuit 23. Capacitor 26, connected across input power leads 24 and 25, is used to attenuate switching spikes that reflect back to the input power source. The DC input power to circuit 11 is pulse-width-modulated by means of switching transistors 33, 34, 35 and 36, which in turn are driven by controlled transformer action of current transformer T. By varying the duty ratio of switching, namely by advancing or delaying the switch conduction time ("on time") of transistors 33 to 36 with respect to the total time for one cycle of switching, it is possible to increase or decrease the average DC power deliverable by the integrating filter circuit 12.

In the integrating circuit 12, series inductance 37 is connected between the cathode side of diode 38 and positive lead of capacitor 39. The anode of diode 38 and negative side of capacitor 39 are connected to common return of DC input. The integrating filter accepts the peak energy of the pulse-width-modulated signal from winding 30 of transformer T during the conduction or "on" time portion of the cycle and smooths it into a DC value averaged over the total time for one cycle. Diode 38 allows continuous conduction of current through inductor 37 into filter capacitor 39 during the non-conducting portion of the cycle.

The voltage-error-sensing circuit 22 consists mainly of potentiometer 121 connected across leads 24' and 25 which transmits an error signal proportional to the preregulated DC voltage from its movable contact to the control amplifier 23 via resistor 122. Resistor 120 provides a current return path for the reference voltage in the control amplifier 22 and is connected between zener reference diode 126 and lead 24'.

The operation of control amplifier 23 is controlled by the error signal emitting from sensing circuit 22. This signal is compared to the reference voltage source of zener diode 126 and thereby determines the bias voltage between the base of transistor 123 and the emitter of transistor 124, which in turn establishes the collector to emitter impedances of transistors 123 and 124, and the current flow through them.

Power is derived from winding 31 of transformer T in circuit 11, and current will flow from anode to cathode of diode 125 and through transistors 123 and 124 during the "off-time" portion of the switching cycle.

By controlling the current drawn from winding 31 of transformer T with a variation of transistor impedances in control amplifier 23, a controlled magnemotive force (ampere-turns) is generated that opposes a fixed magnemotive force developed by bias winding 28, whose current is determined by resistor 27. The resultant magnemotive force directly establishes the amount of core reset of transformer T to negative saturation and indirectly establishes the conduction or "on" time of the cycle, i.e., the time required for the core to switch from negative to position saturation. Thus, the proper duty cycle ratio of switching ("on") time to total cycle time is established which is essential for controlled pulse modulation regulation.

The operation of the frequency control synchronizer circuit 21 is controlled by accurately generated trigger pulses derived from a unijunction oscillator. The input power to the frequency control synchronizer 21 is derived from preregulated DC power. The negative side 84 is connected to common power lead 25 while the positive side 80 is connected from lead 24' to series resistor 82 which is in turn connected to the cathode of zener regulator diode 90, the anode of diode 90 is connected to negative lead 84. The voltage across zener diode 90 is a DC value determined by its regulating voltage point.

The combination of resistors 83, 89 and 91, potentiometer 92, unijunction transistor 81, and capacitor 93 result in positive pulses at twice-rated frequency across resistor 89 with regulated DC power applied which synchronizes inverter 13, that is free-running at a natural frequency slightly less than rated. Potentiometer 92 serves as a frequency adjustment for component and zener diode voltage tolerances. These pulses are impressed every half cycle of rated inverter frequency from unijunction transistor 81 and resistor 89 connection through coupling diode 94 and 95 whose cathodes are connected to the bases of parallel connected transistor pairs 85, 86 and 87, 88 respectively. These transistor pairs in series with diodes 96 and 97, whose cathodes are connected to the transistor collectors, essentially parallel the base drive circuitry of the inverter switching transistor groups 44 to 46 and 47 to 49.

Resistors 98, 99 and 100, 101 diodes 102 and 103 and capacitors 104 and 105 form switching spike differentiating networks that aid turn-on and turnoff action of the frequency synchronizer.

Inverter circuit 13 is basically a standard free-running multivibrator whose natural frequency is determined by the self-saturating characteristics of transformer T1. It consists of parallel connected switching transistor groups 44 to 46 and 47 to 49, base biasing resistors 50, 51 and 53, transformer T1, base windings 41 and 42 and primary windings 40 and 40'. Preregulated DC power is supplied from lead 24' to center tap connection 43 of transformer T1 and is alternately switched through upper primary winding 40, switching transistor group 44 to 46, and returned to common negative lead 25, then through lower primary winding 40', transistor group 47 to 49 and again returned to lead 25. The resultant alternately switched square wave is transformed coupled to the secondary windings and then to the output circuits.

The operation of the control frequency synchronizer circuit 21 in conjunction with inverter circuit 13 is as follows: With Preregulated DC power applied simultaneously to inverter circuit 13 at point 43 and to frequency synchronizer circuit at lead 80, assume that self-saturating action of transformer T1 sets switching transistor group 44 to 46 into conduction by application of positively induced base drive voltage from winding 42 to the base connections of transistors 44 to 46 via series resistor 50 and holds transistors 47 to 49 nonconducting by application of negatively induced base voltage from winding 41 to the base connections of transistors 47 to 49. At some time less than the natural period of transformer T1, the unijunction oscillator will fire and supply positive pulses simultaneously through coupling diodes 94 and 95 to the bases of transistor pairs 85 to 86 and 87, 88.

Transistors 87 and 88 will not conduct when a positive pulse is applied since the anode-to-cathode polarity of diode 97 is such as to block the negative base voltage of winding 41 from the collectors of transistors 87 and 88. Thus, there will be no effect on inverter base drive circuitry when it is in a negative voltage state. In this case, circuitry for transistors 47 to 49. However, transistors 85 and 86 will switch into conduction with the application of a positive pulse, since their collectors will be connected directly to the positive going base voltage of winding 42 by means of conducting series diode 96. When transistors 85 and 86 conduct, base winding 42 is momentarily clamped to ground or DC common thereby interrupting positive base drive power to inverter-switching transistors 44 to 46 and rendering them nonconducting. As a result, flux reversal takes place in transformer T1, which now induces a negative voltage in base winding 42 to insure turnoff of transistors 44 to 46 positive voltage into base winding 41 to switch previously nonconducting transistors 47 to 49 into conduction.

Secondary winding outputs 54, 57, 58 and 59 of transformer T1, whose regulated voltage values are determined by the input preregulator, directly couple AC power to outputs 14, 18, 19 and 20 respectively, as shown in FIG. 2.

The DC postregulator circuit 13' consists primarily of a positive and negative regulator section with lead 60 common to both outputs and connected to center tap 61 of 62 to 65 with the configuration as shown in FIG. 2. Pulsating DC voltage of negative polarity is obtained at the common anode connection of diodes 62 and 64 with the collector of transistor 66 and resistor 67. The other side of resistor 67 connects to the base of series regulating transistor 66 and the collector of control transistor 68 at point 67' and it provides a constant bias current to this point. The emitter of transistor 68 is connected to reference voltage zener diode 69 and resistor 70 which provides a current return path for zener diode 69. Output-sensing potentiometer 71 is connected directly across output 16 and provides a proportional sensing signal to the base of transistor 68 from its center contact. This signal is compared to constant voltage of reference zener diode 69 and establishes a base to emitter bias that controls the conduction of current through transistor 68 from point 67'. Capacitor 72 across output 16 provides ripple-filtering action for a regulated output.

Regulator action occurs for example if output 16 voltage momentarily increases. A proportional error signal increase from center of potentiometer 71 is transmitted to the base of transistor 68 and after being compared to constant voltage of zener diode 69 will increase base-emitter bias of transistor 68. This effects an increase of transistor 68 collector current drawn from point 67', and, since this point is provided with a constant current by resistor 67, a decreasing base current will be available for series-regulating transistor 66. An increase in collector-to-emitter junction impedance of transistor 66 will result, thus increasing series voltage drop across transistor 66 until output 16 stabilizes back to original voltage value.

The positive section is comprised of series-regulating transistor 73, bias resistor 74, control transistor 75, reference zener diode 76 and its return resistor 77, sensing potentiometer 78, and filter capacitor 79 will function in an identical but complimentary manner to that just described for the negative section. The exception being that the cathode connection of diodes 63 and 65 will provide positive voltage to series-regulating transistor 73 and across output 17.

AC postregulator circuit 15' is connected between secondary winding 55 and output 15 and is illustrated in FIG. 3. One side of winding 55 is connected to one of the opposing legs of diode bridge 106. The other opposing leg of bridge 106 is connected directly to one of output 15 terminals. Across the DC sides of diode bridge 106, namely between positive side (common cathode point) and negative side (common anode point) are connected transistor 111 in series with zener 114 and shunt resistor 115 by means of lead 110 and common lead 113. Lead 110 from the positive DC side of bridge 106 is connected directly to the collector and transistor 111 and to the base of transistor 111 via resistor 112.

The diode bridge 106 of AC postregulator circuit 15' as illustrated in FIG. 3 converts the AC square wave from secondary winding 55 into pulsating DC across transistor 111 and zener diode 114 acting as a series-regulating circuit. Resistor 115 which shunts the series regulator circuit acts as a bleeder to initiate regulator feedback. Zener diode 114 acts as a voltage reference source and establishes base to emitter bias for transistor 111 action of a variable series impedance.

The feedback sensing and control amplifier sections have feedback transformer T2 primary across output 15, with its secondary connected to both opposing legs of diode-sensing bridge 107. A sensing potentiometer 119 is connected directly across the negative (common anode) and positive sides (common cathode) of sensing bridge 107. The negative side of this bridge is tied to common lead 113. The movable contact of potentiometer 119 is connected to the anode of zener diode 118 with its cathode connected to base of control amplifier transistor 115 and parallel network of capacitor 116, for reduction of ripple and transients from DC bridge 107, and thermistor 117 for regulator temperature compensation. The emitter of transistor 115 is tied to common lead 113 and its collector is connected to the base of regulating transistor 111 and bias resistor 112. AC regulation occurs, for example, if output 15 voltage raises. An increased DC-sensing voltage from the center contact of potentiometer 119 via sensing transformer T2 and bridge 107 will increase current through zener diode 118, and, in turn, increases collector current through transistor 115 and voltage drop across resistor 112. This effectively reduces base voltage of regulating transistor 111, and, when compared to fixed reference voltage of zener diode 114, reduces the base to emitter bias of transistor 111. As a result of this bias reduction, the net impedance of series regulator and pulsating DC voltage drop across it will increase. This dropping action will continue until AC voltage output of 15 recovers to its originally set value.

I claim:

1. A regulation circuit to provide regulated AC and DC supplies comprising means to provide a source of unregulated DC voltage, modulation means for receiving the unregulated DC voltage and for providing a pulse-modulated output therefrom, integrating means for receiving said modulated output and for providing a preregulated DC voltage output, voltage-error-sensing means connected to the output of said integrating means for monitoring the value of said preregulated DC voltage thereby establishing a corrective output signal, means connecting said voltage-error-sensing means to said modulation means for comparing said corrective output signal with a reference to adjust the operation of said modulation means, inverter circuit means for receiving said preregulated DC voltage and for providing various levels of regulated AC outputs and regulated DC outputs, and frequency control synchronizer means connected between said integrating means and said inverter circuit means for accurately determining the AC frequency required and controlling said inverter circuit means to this frequency, said modulation means comprising a transistor, a transformer, a winding of the transformer being connected in a series circuit including a terminal of the source, the emitter and collector electrodes of the transistor and an output terminal, the transformer having a bias winding connected across the emitter and collector electrodes and a feedback winding, said correction signal being applied to the feedback winding.

2. A regulation circuit according to claim 1, wherein said comparing means includes amplifier means.

3. A regulation circuit according to claim 1, wherein DC postregulator means is disposed in said DC outputs.

4. A regulation circuit to provide regulated AC and DC supplies comprising means to provide a source of unregulated DC voltage, modulation means for receiving the unregulated DC voltage and for providing a pulse-width-modulated DC output therefrom, integrating means for receiving said modulated output and for providing a smoothed preregulated DC voltage output, voltage-error-sensing means connected to the output of said integrating means for monitoring the value of said preregulated DC voltage thereby establishing a corrective output signal, means connecting said voltage-error-sensing means to said modulation means for comparing said corrective output signal with reference voltage to adjust the off-on time of the pulses provided by said modulation means, inverter circuit means including a free-running oscillator energized by said preregulated DC voltage for providing various levels of preregulated AC outputs and preregulated DC outputs, and frequency control synchronizer means energized by the preregulated voltage and connected to said inverter circuit means for accurately determining the AC frequency required and controlling said inverter circuit means to this frequency, and AC postregulator means disposed in at least one of said AC and DC outputs.

5. A regulation circuit to provide regulated AC and DC supplies comprising means to provide a source of unregulated DC voltage, modulation means for receiving the unregulated DC voltage and for providing a modulated output therefrom, integrating means for receiving said modulated output and for providing a preregulated DC voltage output, voltage-error-sensing means connected to the output of said integrating means for monitoring the value of said preregulated DC voltage thereby establishing a corrective output signal, means connecting said voltage-error-sensing means to said modulation means for comparing said corrective output signal with a reference to adjust the operation of said modulation means, inverter circuit means for receiving said preregulated DC voltage and for providing various levels of regulated AC outputs and regulated DC outputs, and frequency control synchronizer means connected between said integrating means and said inverter circuit means for accurately determining the AC frequency required and controlling said inverter circuit means to this frequency, at least one of the AC outputs being postregulated by a circuit comprising a pair of input terminals coupled to the inverter circuit means and across which the AC voltage appears, a pair of output terminals for the regulated AC voltage, a full-wave rectifying network having input leads for the AC current connected in series between one input terminal and one output terminal and having a pair of output leads for the DC current, a unidirectional variable impedance means comprising an electron-translating device having its input and output electrodes connected in series with the output leads of the network and having a control electrode, means connected across the output terminals for deriving a sensing voltage, and means responsive to the sensing voltage for applying bias to the control electrode to adjust the impedance as the voltage across the output terminals departs from a predetermined amplitude.

6. A regulation circuit to provide regulated AC and DC supplies comprising means to provide a source of unregulated DC voltage, modulation means for receiving the unregulated DC voltage and for providing a modulated output therefrom, integrating means for receiving said modulated output and for providing a preregulated DC voltage output, voltage-error-sensing means connected to the output of said integrating means for monitoring the value of said preregulated DC voltage thereby establishing a corrective output signal, means connecting said voltage-error-sensing means to said modulation means for comparing said corrective output signal with a reference to adjust the operation of said modulation means, inverter circuit means for receiving said preregulated DC voltage and for providing various levels of regulated AC outputs and regulated DC outputs, and frequency control synchronizer means connected between said integrating means and said inverter circuit means for accurately determining the AC frequency required and controlling said inverter circuit means to this frequency, the DC output being postregulated by a circuit comprising means for rectifying the output of the inverter, a pair of input terminals for the rectified voltage, a pair of output terminals, a transistor having its emitter and collector electrodes connected in series between an input and output terminal, the other input and output terminal being connected in common, a fixed impedance and a variable impedance connected in series across the input terminals, and having their junction point connected to the control electrode whereby a constant current flow at the junction is established, and means responsive to the change in voltage at the output terminals from a predetermined value for adjusting the variable impedance to thus vary the impedance of the transistor to current flow.